(12) United States Patent

Allcock et al.

(10) Patent No.: US 7,783,726 B2
(45) Date of Patent: Aug. 24, 2010

(54) AUTOMATION APPARATUSES WITH INTEGRATED COMMUNICATIONS SERVERS

(75) Inventors: David John Allcock, Markham (CA); Jeffrey Glenn Mazereeuw, Newmarket (CA)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 12/200,420

(22) Filed: Aug. 28, 2008

(65) Prior Publication Data

US 2010/0057225 A1    Mar. 4, 2010

(51) Int. Cl.
   G06F 15/173    (2006.01)
   G05B 9/02    (2006.01)

(52) U.S. Cl. .................. 709/219; 709/224; 709/229; 709/234; 709/238; 709/206; 370/241; 370/235; 370/428; 370/230; 705/7; 700/9; 700/79; 700/295

(58) Field of Classification Search ................ 709/219, 709/224, 229, 234, 238, 206, 230
   See application file for complete search history.

(56) References Cited

U.S. PATENT DOCUMENTS

| 7,085,938 | B1 | 8/2006 | Pozzuoli et al. |
| 7,392,100 | B1 | 6/2008 | Thomas et al. |
| 2004/0098170 | A1 | 5/2004 | Deck et al. |
| 2006/0179355 | A1* | 8/2006 | Bouchard .................. 714/42 |

FOREIGN PATENT DOCUMENTS

| DE | 19722898 A1 | 12/1998 |
| EP | 1780858 A | 5/2007 |

OTHER PUBLICATIONS

International Search Report issued in connection with corresponding PCT Application No. PCT/US2009/054616 on Dec. 7, 2009.

* cited by examiner

*Primary Examiner*—Jude J Jean Gilles
(74) *Attorney, Agent, or Firm*—GE Global Patent Operation; Roger C. Phillips

(57) ABSTRACT

A protection relay with integrated communications may include a protective relay portion to perform protective relay operations associated with a load operatively connected to the protection relay, and a communications server portion to perform communications operations as an independently operating communications server.

18 Claims, 3 Drawing Sheets

AUTOMATION APPARATUSES WITH INTEGRATED COMMUNICATIONS SERVERS

BACKGROUND OF THE INVENTION

Embodiments of the invention generally relate to communication servers, and more particularly to integration of communications servers on automation apparatuses.

Automation apparatuses may be used in industrial, commercial, and residential applications, for protecting electrical devices and providing control automation. There exists a plurality of applications for these apparatuses, for example protection relays, including, but not limited to, motor protection and starter relays, auxiliary relays, bus protection, control and transfer switches, differential and timing relays, directional relays, feeder protection, generator protection, network communication protection, pilot and distance relays, synchronizer relays, transformer protection, and other suitable applications. Furthermore, in any applicable instance, there may be several protection relays used across an entire automation system. Moreover, communication may be necessary to and from every protection relay for the automation system.

Turning to FIG. 1, an example automation system 100 is illustrated depicting a conventional communications arrangement. As illustrated, system 100 includes an automation application 101 in active communication with network 102. The automation application 101 may be an application for control of a process such as a factory automation process, conveyance system process, heating-ventilation-air-conditioning (HVAC) process, or any suitable process. The automation application 101 may reside on a computer apparatus or a processor of the computer apparatus, and may direct the processor of the computer apparatus to perform functions or acts to control the process. For example, the automation process 101 may, over network 102, communicate with communications server 103. The communications server 103 may direct operations of relays 106 and/or PLC (Programmable Logic Controller) 105 to control the process. The communications server 103 may communicate with the relays 106 and/or PLC 105 over channel 104. Channel 104 maybe a channel suitable for device level communications. Typical examples of such channels include 4-wire communications protocols, differential serial buses, remote input/output busses, or other suitable device level communications channels. Furthermore, as the communications server 103 communicates directly with relays 106 and/or PLC 105, it may direct relays 106 and/or PLC 105 to perform control operations such as activation/deactivation of motors 107, control of load 108, and/or other similar operations.

However, it should be appreciated that communications server 103 provides communications between the automation application 101 and devices for control automation. Therefore, any issues or problems with the systemic operation of the communications server 103 may result in significant downtime of the process being controlled and/or failure of the automation system 100 (e.g., every device is controlled through the communications server 103). It should further be appreciated that downtime or failure of the automation system 100 could result in injury to factory employees or significant loss of factory output.

BRIEF DESCRIPTION OF THE INVENTION

An embodiment of the invention includes a protection relay with integrated communications. The protection relay may include a protective relay portion to perform protective relay operations associated with a load operatively connected to the protection relay, and a communications server portion to perform communications operations as an independently operating communications server.

Additional embodiments of the invention include automation systems including at least one protection relay with integrated communications and at least one automation application. The at least one protection relay may include a protective relay portion to perform protective relay operations associated with a load operatively connected to the protection relay, and a communications server portion to perform communications operations as an independently operating communications server. The at least one protection relay and the at least one automation application may be in operative communication with a network.

BRIEF DESCRIPTION OF THE DRAWINGS

These and other features, aspects, and advantages of the present invention will become better understood as the following detailed description is read with reference to the accompanying drawings in which like reference numerals represent like elements throughout the drawings, wherein.

DETAILED DESCRIPTION OF THE INVENTION

Figure 1:
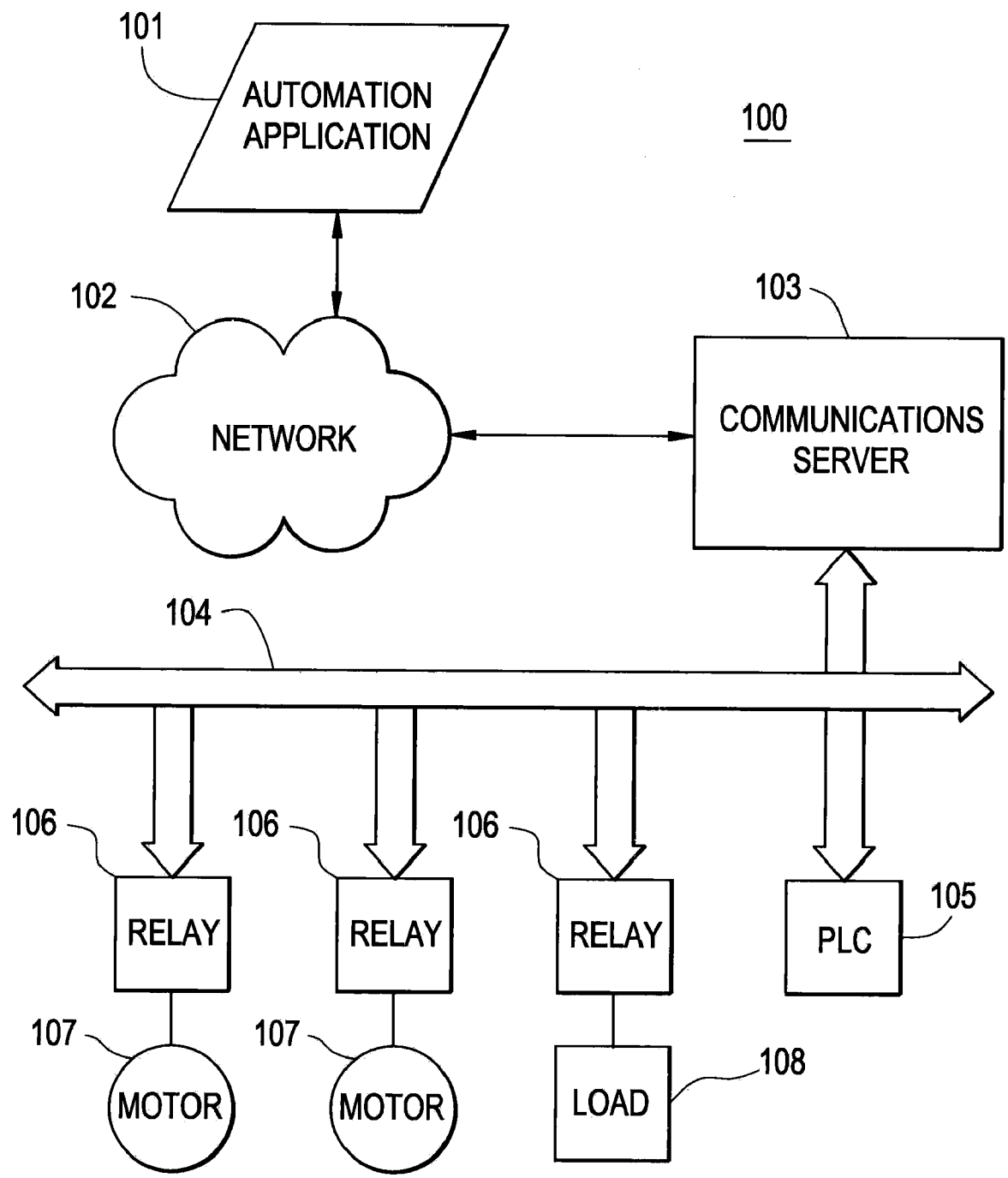
FIG. 1 is a diagram of an example automation system.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising," "includes," and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
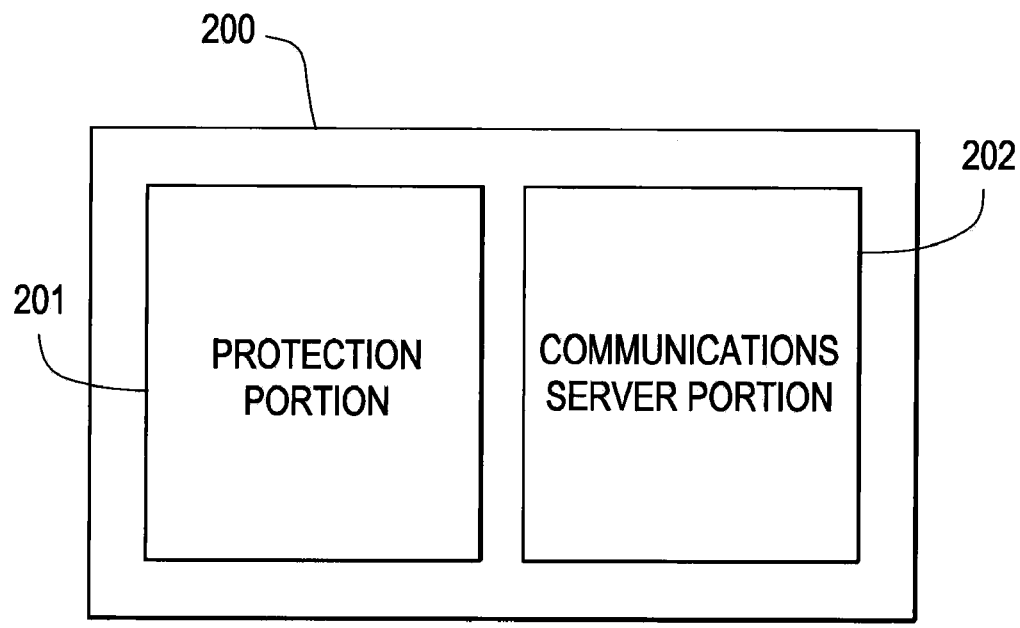
FIG. 2 is a block diagram of an exemplary automation apparatus, in accordance with an example embodiment of the present invention.

Hereinafter, example embodiments of the present invention will be described in detail. According to example embodiments, automation apparatuses with integrated communications servers are disclosed. Such apparatuses may be readily used in automation systems and other useful applications including, but not limited to, motor protection, bus protection, control and transfer applications, differential and timing applications, directional applications, feeder protection, generator protection, network communication protection, transformer protection, load metering, and other suitable applications. Turning to FIG. 2, an automation apparatus according to example embodiments of the present invention is illustrated.

FIG. 2 is a block diagram of an exemplary automation apparatus in accordance with an example embodiment of the present invention. As illustrated in FIG. 2, protection relay 200 includes a protection and/or relay portion 201, and a communications server portion 202.

The protection relay portion 201 may include any necessary components for protection operations, relay operations, and or metering operations. For example, portion 201 may include contact switches for control of one or more phase lines of alternating current. Similarly, portion 201 may include contact switches for control of one or more lines of direct current. Portion 201 may further include relay coils for control of the contact switches. The relay coils may be inductive coils allowing for closure and opening of the contact switches. Furthermore, the contact switches may include a protective component(s), such as an overload contact, to protect any load across the contact switches. Therefore, according to exemplary embodiments, automation apparatuses may provide electromechanical protective relay operation.

Alternatively, portion 201 may include solid-state relay components necessary for protection and relay operations. For example, portion 201 may include an opto-coupled load switching vehicle. The load switching vehicle may contain a variety of semiconductor components including photo-diodes and photo-voltaic sources for opto-coupling, and semiconductor switches, rectifiers, thyristors, transistors, and/or field effect transistors (FETs) for load switching. Furthermore, the load switching vehicle may include a semiconductor-based overload protection component system, or other suitable protection means, to protect a load on the load switching vehicle. Therefore, according to exemplary embodiments, protection relays may provide solid-state protective relay operation.

Alternatively, portion 201 may include metering components configured to monitor a load in operative communication with the automation apparatus 200. For example, the portion 201 may include components configured to sample, calculate RMS, execute metering algorithms, etc. Moreover, any combination of protective relay components and/or metering components may be further included in portion 201.

With regards to the communications server portion 202, portion 202 may include necessary components for operation as a communications server. For example, portion 202 may include a physical-layer interface for connection to a network or other communications channel. The physical-layer interface may include any applicable standard networking components to enable communication across a standard medium. Standard mediums may include Ethernet, wireless links, or other suitable mediums. Portion 202 may further include a port control interface to control port communications of the communications interface. Portion 202 may further include a micro-processor and memory to control communications. Alternatively, portion 202 may include a processor/memory interface to communicate with an external processor (i.e., external to portion 202, not to protection relay 200) to control communications. Thus, communications server portion 202 may function as a communications server. Therefore, according to exemplary embodiments, automation apparatuses may include embedded communications servers. It is appreciated the embedded communications server may act as independent communications servers, and may communicate directly with a network and/or automation application.

According to at least one example embodiment, communications server portion 202 functions as an OPC server (OLE for process control server, or Object-linking and Embedding for process control server). OPC Specifications are based on the OLE technologies and define a standard set of objects, interfaces, and methods for use in process control and manufacturing automation applications to facilitate interoperability of components and applications. OPC server technology is designed to bridge computer based applications, process control hardware, and software applications (e.g., automation applications).

OPC servers provide a means for many different software packages to access data from a process control device, such as a PLC or other physical devices. OPC server applications may be software based and saved to memory of a processing device (e.g., communications server portion 202 including a memory). Thus, if an OPC server application is written for a particular device, it may be reused by any application that is able to act as an OPC client. Further, basic computer components may be used to implement an OPC server. As such, a processor, memory, and communications interface may be used to implement an OPC server according to example embodiments. Hereinafter, exemplary communications portions of automation apparatuses according to exemplary embodiments are described in detail.

Figure 3:
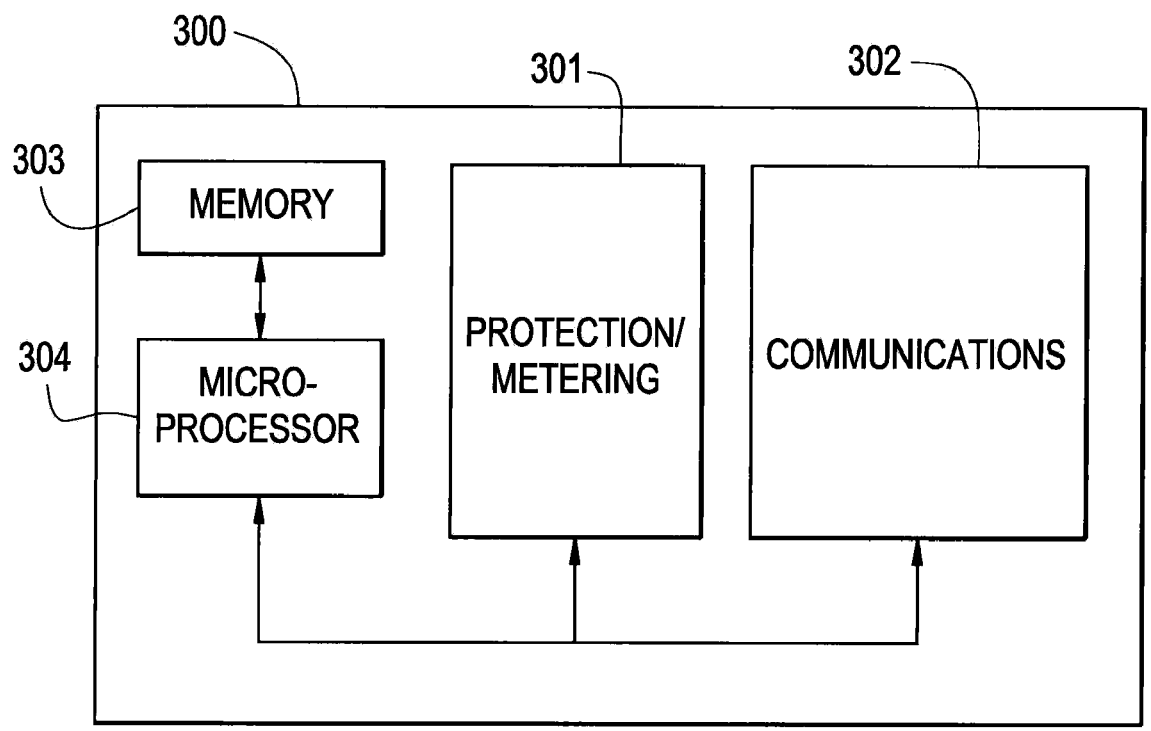
FIG. 3 is a detailed diagram of an exemplary automation apparatus, in accordance with an example embodiment of the present invention.

FIG. 3 is a detailed diagram of an exemplary automation apparatus, in accordance with an example embodiment of the present invention. Apparatus 300 includes protection portion 301 (having disconnect contacts and an operatively connected opening mechanism, or a electric metering system, for example), communications portion 302, memory 303, and microprocessor 304. As illustrated, microprocessor 304 is operatively connected to memory 303. Thus, microprocessor 304 may retrieve and store instructions and methodology from/on memory 303. Microprocessor 304 may be a general purpose computer processor, or may be a specially designed processor. A general purpose computer processor may allow processing of universal software applications, while a specially designed processor may allow processing of particular software methodologies, such as ladder-logic or parallel logic useful in some control applications. Therefore, example embodiments should not be limited to any particular type of processor.

As further illustrated in FIG. 3, microprocessor 304 is operatively connected to protection portion 301. Thus, microprocessor 304 may monitor protection portion 301, and provide feedback on the state of operation of the protection portion 301. Further, microprocessor 304 may control protection portion 301, thereby enabling full control of the relay and/or metering operations of the apparatus 300. Furthermore, microprocessor 304 is operatively connected to communications portion 302. Therefore, microprocessor 304 may provide software control of communications for the apparatus 300. For example, a software application may be written as an OPC server algorithm. The OPC server algorithm may be stored in memory 303, and may direct the microprocessor 304 to perform operations consistent with OPC server operation. Therefore, the microprocessor 304 may control the communications portion 302 and direct the communications portion 302 to function as a communications server over a physical-layer communication interface or other interface. Thus, as described above, exemplary embodiments provide automation apparatuses with an integrated communications server.

Figure 4:
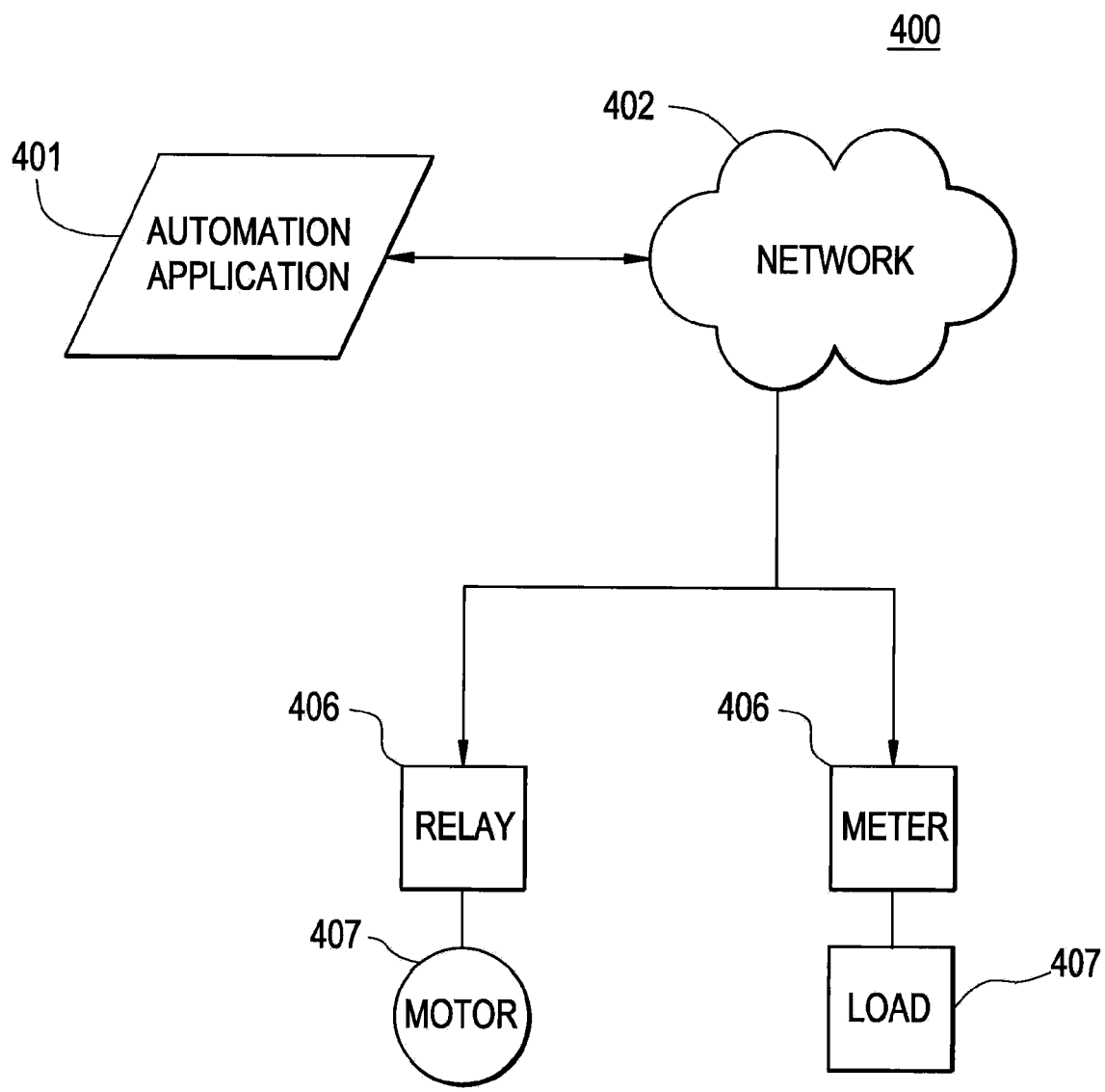
FIG. 4 is a diagram of an example automation system, in accordance with an example embodiment of the present invention.

FIG. 4 is a diagram of an example automation system, in accordance with an example embodiment of the present invention. It is noted that FIG. 4 depicts only one example implementation of apparatuses according to example embodiments, and should not be construed as limiting. For example, more or less relays/meters may be included, and different components may further be included depending upon the particular application needed. As exhaustive description of every possible iteration of applications of exemplary embodiments is not the purpose of this disclosure, it should be appreciated that FIG. 4 provides insight into only one possible implementation.

Turning now to FIG. 4, automation system 400 includes automation application 401 in operative communication with network 402. Furthermore, automation apparatuses 406 are in operative communication with network 402. Apparatuses 406 may be substantially similar to any of the automation apparatuses depicted in FIGS. 2-3, and may therefore have integrated communications servers. As such, automation apparatuses 406 may communicate directly with automation application 401 through the integrated communication servers, for example, utilizing a physical-layer communications interface. Therefore, if any communications server existing on any of automation apparatuses 406 exhibits operational issues, only the components controlled by the particular apparatus will be troublesome, thereby facilitating easier troubleshooting compared with conventional technology. Further, any malfunctioning apparatus may be readily replaced, thereby facilitating less downtime compared with conventional technology. As such, advantages over the conventional technology are readily apparent through examination of FIG. 4.

As described above, example embodiments of the present invention provide protection relays with integrated communications servers. With only some example embodiments of the present invention having thus been described, it will be obvious that the same may be varied in many ways. Such variations are not to be regarded as a departure from the spirit and scope of the present invention, and all such modifications are intended to be included within the scope of the present invention as stated in the following claims.

What is claimed is:

1. A protection relay with integrated communications, comprising:
a memory;
a processor operatively connected to the memory;
a protective relay portion in operative communication with the processor and configured to perform protective relay operations associated with load contacts operatively connected to the protective relay portion; and
a communications server portion in operative communication with the processor and configured to perform communications operations as an independently operating communications server, wherein,
the communications server portion includes networking components operatively connected to a physical-layer communications interface,
the communications server portion includes a processor interface operatively connected to the processor, and
the processor interface is in operative communication with the physical-layer communications interface.

2. The protection relay of claim 1, wherein:
the independently operating communications server is an object-linking and embedding for process control server (OPC Server).

3. The protection relay of claim 1, further comprising:
a communications server application residing on the processor, wherein the communications server application directs the processor to control the communications server portion as the independently operating communications server.

4. The protection relay of claim 3, wherein:
the communications server application is an object-linking and embedding for process control application.

5. The protection relay of claim 1, wherein the processor interface is configured to enable communication of instructions between the communications server portion and the processor.

6. The protection relay of claim 1, wherein the communications server portion includes:
a dedicated communications memory configured to store communications specific instructions and information.

7. The protection relay of claim 1, wherein the communications server portion includes:
a port control portion configured to control port communications over the physical-layer communications interface.

8. The protection relay of claim 1, wherein the protective relay portion includes:
a solid-state relay component system operatively connected to the load contacts.

9. The protection relay of claim 1, wherein the protective relay portion includes:
an electro-mechanical relay component system operatively connected to the load contacts.

10. An automation system, comprising:
at least one protection relay as claimed in claim 1 in operative communication with a network; and
at least one automation application residing on a processor of a computer apparatus in operative communication with the network.

11. The automation system of claim 10, wherein the at least one automation application directs the at least one protection relay to perform tasks associated with a protection relay through direct communication with the communications server portion.

12. The automation system of claim 10, wherein the at least one automation application is an object-linking and embedding for process control application (OPC application) in communication with a second OPC application residing on the processor of the at least one protection relay.

13. The automation system of claim 10, wherein the communications server portion of the at least one protection relay includes a dedicated communications memory configured to store communications specific instructions and information.

14. The automation system of claim 13, wherein the communications server portion of the at least one protection relay includes a port control portion configured to control port communications over the physical-layer communications interface.

15. The automation system of claim 10, wherein the protective relay portion of the at least one protection relay includes:
   a solid-state relay component system operatively connected to the load contacts of the at least one protection relay.

16. The automation system of claim 10, wherein the protective relay portion of the at least one protection relay includes:
   an electro-mechanical relay component system operatively connected to the load contacts of the at least one protection relay.

17. The automation system of claim 10, wherein the network is an Ethernet network.

18. The automation system of claim 10, wherein the network is a wireless network.

* * * * *